(12) United States Patent
Aitken et al.

(10) Patent No.: US 9,762,325 B2
(45) Date of Patent: Sep. 12, 2017

(54) RELATING TO ANTENNAS

(71) Applicant: BAE SYSTEMS plc, London (GB)

(72) Inventors: David John Aitken, Isle of Wight (GB); Simon Charles Giles, Chelmsford (GB); Robert John Mark Longstone, Isle of Wight (GB); Mohammed Nawaz, Chelmsford (GB); Andrew James Smith, Chelmsford (GB); Michael Andrew Scott, Isle of Wight (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 14/651,894

(22) PCT Filed: Dec. 13, 2013

(86) PCT No.: PCT/GB2013/053287
§ 371 (c)(1),
(2) Date: Jun. 12, 2015

(87) PCT Pub. No.: WO2014/091242
PCT Pub. Date: Jun. 19, 2014

(65) Prior Publication Data
US 2015/0304043 A1    Oct. 22, 2015

(30) Foreign Application Priority Data

Dec. 14, 2012  (EP) ...................................... 12275206
Dec. 14, 2012  (GB) ................................... 1222608.0

(51) Int. Cl.
*H04B 10/00* (2013.01)
*H04B 10/2575* (2013.01)
(Continued)

(52) U.S. Cl.
CPC ..... *H04B 10/25752* (2013.01); *G02B 6/3604* (2013.01); *H01Q 3/2676* (2013.01); *H04B 10/516* (2013.01); *H04B 10/801* (2013.01)

(58) Field of Classification Search
None
See application file for complete search history.

(56) References Cited

U.S. PATENT DOCUMENTS 5,371,814 A   12/1994  Ames et al.
5,933,113 A    8/1999  Newberg et al.
(Continued)

FOREIGN PATENT DOCUMENTS

EP    0871343 A2   10/1998
GB    2145570 A     3/1985
(Continued)

OTHER PUBLICATIONS

International Search Report received for Patent Application No. PCT/GB2013/053287, mailed on Mar. 31, 2014. 4 pages.
(Continued)

*Primary Examiner* — Ken N Vanderpuye
*Assistant Examiner* — David Lambert
(74) *Attorney, Agent, or Firm* — Finch & Maloney PLLC

(57) ABSTRACT

An optical signal transmission apparatus (1) for a rotating antenna comprising a plurality of optical modulators (6) arranged for receiving a respective plurality of analog RF signals (5) and for modulating a respective plurality of optical signals therewith to produce a plurality of modulated analog optical signals (8). A plurality of opto-electrical converters (14) each converts a respective modulated analog optical signal (13) into an analog electrical signal. The plurality of optical modulators (6) are rotationally coupled in
(Continued)

optical communication with the plurality of opto-electrical converters (14) via an optical rotary joint (10) including a reversion prism.

20 Claims, 3 Drawing Sheets

(51) Int. Cl.
    *G02B 6/36* (2006.01)
    *H01Q 3/26* (2006.01)
    *H04B 10/80* (2013.01)
    *H04B 10/516* (2013.01)

(56) References Cited

U.S. PATENT DOCUMENTS

| | | | |
|---|---|---|---|
| 6,320,539 B1 | 11/2001 | Matthews et al. | |
| 7,146,069 B1* | 12/2006 | Bowers | G02B 6/2861 385/18 |
| 2002/0181668 A1 | 12/2002 | Masoian et al. | |
| 2005/0036735 A1* | 2/2005 | Oosterhuis | G02B 6/4428 385/26 |
| 2006/0182446 A1 | 8/2006 | Kim et al. | |
| 2007/0019908 A1* | 1/2007 | O'Brien | G02B 6/3604 385/36 |
| 2009/0027268 A1* | 1/2009 | Coward | H01Q 3/2676 342/375 |
| 2009/0142017 A1 | 6/2009 | Merlet et al. | |
| 2009/0214213 A1 | 8/2009 | Chen et al. | |
| 2012/0243874 A1 | 9/2012 | Logan, Jr. et al. | |

FOREIGN PATENT DOCUMENTS

| | | |
|---|---|---|
| WO | 2005119842 A1 | 12/2005 |
| WO | 2007010362 A2 | 1/2007 |
| WO | 2014091242 A1 | 6/2014 |

OTHER PUBLICATIONS

GB Intellectual Property Office Search Report under Section 17(5) received for GB Patent Application No. 1222608.0, mailed May 16, 2013. 4 pages.

Extended European Search Report received for EP Patent Application No. 12275206.6, mailed May 14, 2013. 8 pages.

Tong, et al., "Multiwavelength Optically Controlled Phased-Array Antennas," IEEE Transactions on Microwave Theory and Techniques, vol. 46, No. 1, Jan. 1998. pp. 108-115.

Bibey, et al., "Optical Distribution of Local Oscillators for a Rotating Antenna," Microwave Symposium Digest. 2000 IEEE MTT-S Digest. pp. 1257-1260.

International Preliminary Report on Patentability and Written Opinion received for Patent Application No. PCT/GB2013/053287, mailed on Jun. 25, 2015. 6 pages.

* cited by examiner

RELATING TO ANTENNAS

FIELD OF THE INVENTION

The present invention relates to rotary joints for rotating antenna systems, and particularly, but not exclusively, to rotary joints for radar antenna systems.

BACKGROUND

A typical rotary joint is an electro-mechanical device that provides the required signal transfer interface between the stationary and rotating sections of a rotating antenna system. It allows radio-frequency (RF) signals to be transmitted back and/or forth between the antenna and other components of an antenna apparatus.

RF rotary joints are used in many industries. These industries include communication, satellites, aerospace and air traffic control, airborne systems, shipboard systems, ground based radar.

A rotary joint is a passive rotating transmission line that has the ability to pass RF signals with minimal degradation. However, the more RF channels required to be transmitted, generally the longer must be the rotary joint. A rotary joint can be as simple as a one-channel transmission device which is typically small (several cm in length), or as complicated as, say, a transmission device for transmitting several 10s of channels which is much longer (several meters long).

RF rotary joints can be made of copper, bronze, aluminum, stainless steel, specialty steels, silver, and specially clad or bi-metallic alloys. Important specifications for RF rotary joints include size, length and weight. Clearly, the metallic nature of RF rotary joints renders them relatively heavy.

Transferring a radio-frequency (RF) signal across the rotary joint of a rotating antenna, such as a radar antenna array, can require large and heavy RF rotary joints close to the antenna and typically high on an antenna mast, e.g. a ship's mast. This becomes a particular problem when considering antenna arrays having many RF channels, requiring a long and heavy RF rotary joint.

The invention addresses this.

SUMMARY OF THE INVENTION

At its most general, the invention is to modulate the power of an optical signal using an analogue electrical signal from an RF receiver or signal source of an antenna in order to transfer the analogue optical signal, conveying the information from within the RF electrical signal, across an optical rotary joint of the rotating antenna system. After transfer, the modulated analogue optical signal may then be converted into an electrical analogue signal and subsequently processed digitally. It has been found possible to transfer analogue RF signals using an optical rotary joint that is small and light-weight.

Analogue signal transmission also removes the need for analogue-to-digital processors at the antenna array. It has been found possible to transfer input electrical analogue signals in this way such that the amplitude of the transferred analogue signal is accurately transferred and recovered when converted back into an electrical analogue output signal.

This is a surprising result, because in the technical field of the invention, there exists a perception that the optical transfer of data in RF communications systems should always be digital because digital data signals in general are often less susceptible to data loss or errors during transmission, and amenable to error correction. It is perceived that there would be generally insurmountable difficulty in sufficiently accurately controlling optical signal amplitude/power levels necessary to achieve a desired accuracy in data transfer by analogue signals optically, especially when transferring multiple signal channels.

The invention preferably employs a "Dove" prism, or an "Abbe-Konig" prism, both also known as a reversion prism, within the optical rotary joint. When such a prism is rotated about its length axis, an image viewed through the prism rotates at twice the prism rotation rate, but the output position remains unchanged, and an output ray is parallel with the input ray at all prism rotation angles.

Multiple channels may be transferred to the reversion prism on a corresponding multitude of input optical fibres, or waveguides, which rotate with the antenna, and after having transferred across the reversion prism, each channel may then be output from the reversion prism to another corresponding multitude of optical fibres, or waveguides, that are non-rotating.

In a first of its aspects, the invention may provide an optical signal transmission apparatus for a rotating antenna comprising, a plurality of optical modulators arranged for receiving a respective plurality of analogue RF signals and for modulating a respective plurality of optical signals therewith to produce a plurality of modulated analogue optical signals, a plurality of opto-electrical converters for converting a respective modulated analogue optical signal into an analogue electrical signal, wherein the plurality of optical modulators are rotationally coupled in optical communication with the plurality of opto-electrical converters via an optical rotary joint including a reversion prism. The reversion prism may be a Dove prism or an Abbe-Konig prism.

The optical modulators preferably include a laser, such as a continuous-wave laser, for generating an optical carrier signal and an optical modulator unit (e.g. a Mach-Zehnder (MZ) modulator) arranged to modulate the carrier signal according to the analogue RF signal.

The optical modulator unit preferably includes a biasable component being configurable to be biased by the application of a bias voltage such that the modulator operates at quadrature.

The optical signal transmission apparatus may include a bias control means arranged to vary the bias voltage applied to the biasable component until the value of the bias voltage is the value closest to a bias voltage (e.g. 0 (zero) Volts) at which the modulator operates at quadrature. This allows the apparatus to maintain operation of the optical modulator units with a more consistent modulation transfer characteristic thereby better maintaining a desired accuracy in modulated analogue optical signal levels over a wide dynamic range.

The reversion prism is preferably rotationally coupled to the plurality of optical modulators and the plurality of opto-electrical converters so as to be rotatable relative to both at an angular rate of rotation that is substantially half the angular rate of rotation at which the plurality of optical modulators are concurrently rotatable relative to the plurality of opto-electrical converters. Thus, the optical modulators may be arranged on a rotary part of an antenna assembly and the opto-electrical converters may be arranged on a stationary part of the assembly together with electrical signal processing components and control components of the assembly. Gearing means may couple a housing containing the optical modulators to a housing containing the reversion prism and may be arranged to transfer rotary motive force to the housing containing the reversion prism from the housing containing the optical modulators at substantially one half (½) the angular rate.

The optical signal transmission apparatus may comprise a first optical collimator unit arranged to receive and to collimate a said plurality of modulated analogue optical signals for input to the reversion prism, and a second optical collimator unit arranged to receive and to collimate the plurality of modulated analogue optical signals output from the reversion prism, wherein the first and second collimator units share substantially parallel axes of collimation. Preferably, the first optical collimator unit is arranged to receive analogue optical signals from the second optical collimator unit—i.e. operating reciprocally, or as a two-way optical transfer set-up.

The optical signal transmission apparatus may comprise at least 20 optical modulators and 20 opto-electrical converters, or at least 30. Thus, many optical analogue signal channels may be provided for transferring optically via the optical rotary joint. The first and second optical collimator units may each comprise a corresponding number of optical fibres which terminate therein and are in optical communication with a respective one of the optical modulators and opto-electrical converters, respectively, of the apparatus. The optical axes of the optical fibres at the terminal ends thereof in each of the first and second collimator units is preferably parallel to the optical axis of the reversion prism between them. In this way, any one optical fibre terminal end in one of the first and second collimator units is maintained, by the reversion prism, in optical communication with the same one optical fibre terminal end in the other one of the first and second collimator units, irrespective of the state of relative rotation of the two collimator units.

In a second aspect, the invention may provide a method for optical signal transmission for a rotating antenna comprising, receiving a plurality of analogue RF signals at a respective plurality of optical modulators and modulating a respective plurality of optical signals therewith to produce a plurality of modulated analogue optical signals, optically transmitting the plurality of modulated analogue optical signals to a plurality of opto-electrical converters via an optical rotary joint including a reversion prism, converting each modulated analogue optical signal into a respective analogue electrical signal using the plurality of opto-electrical converters.

The optical modulators preferably include a laser for generating an optical carrier signal and an optical modulator unit (e.g. a Mach-Zehnder (MZ) modulator), and the method preferably includes modulating the carrier signal using the optical modulator unit according to the analogue RF signal. The analogue RF signal may be applied to the optical modulator unit as a modulation signal.

The optical modulator unit preferably includes a biasable component, and the method preferably includes biasing the bias able component by the application of a bias voltage such that the modulator operates at quadrature.

The method may include varying the bias voltage applied to the biasable component until the value of the bias voltage is the value closest to a bias voltage (e.g. 0 (zero) Volts) at which the modulator operates at quadrature.

The method may include rotating, in use, the plurality of optical modulators relative to the plurality of opto-electrical converters at an angular rate of rotation, and concurrently rotating the reversion prism relative to the plurality of optical modulators and the plurality of opto-electrical converters at an angular rate of rotation that is substantially half the angular rate of rotation.

The method may comprise collimating the plurality of modulated analogue optical signals according to a first axis of collimation, inputting the collimated plurality of modulated analogue optical signals to the reversion prism, and receiving and collimating the plurality of modulated analogue optical signals output from the reversion prism according to second axis of collimation substantially parallel to the first axis of collimation. The method may include collimation in this way for optical transfer in any direction through the reversion prism.

The method may include receiving, optically modulating, optically transmitting and subsequently demodulating at least 20, or at least 30, analogue RF signals concurrently.

In a further aspect, the invention provides a computer program or plurality of computer programs arranged such that when executed by a computer system it/they cause the computer system to operate to control an optical signal transmission apparatus in accordance with the method of any of the above aspects.

In a yet further aspect, the invention provides a machine-readable storage medium storing a computer program or at least one of the plurality of computer programs according to the above aspect.

DETAILED DESCRIPTION

Figure 1:
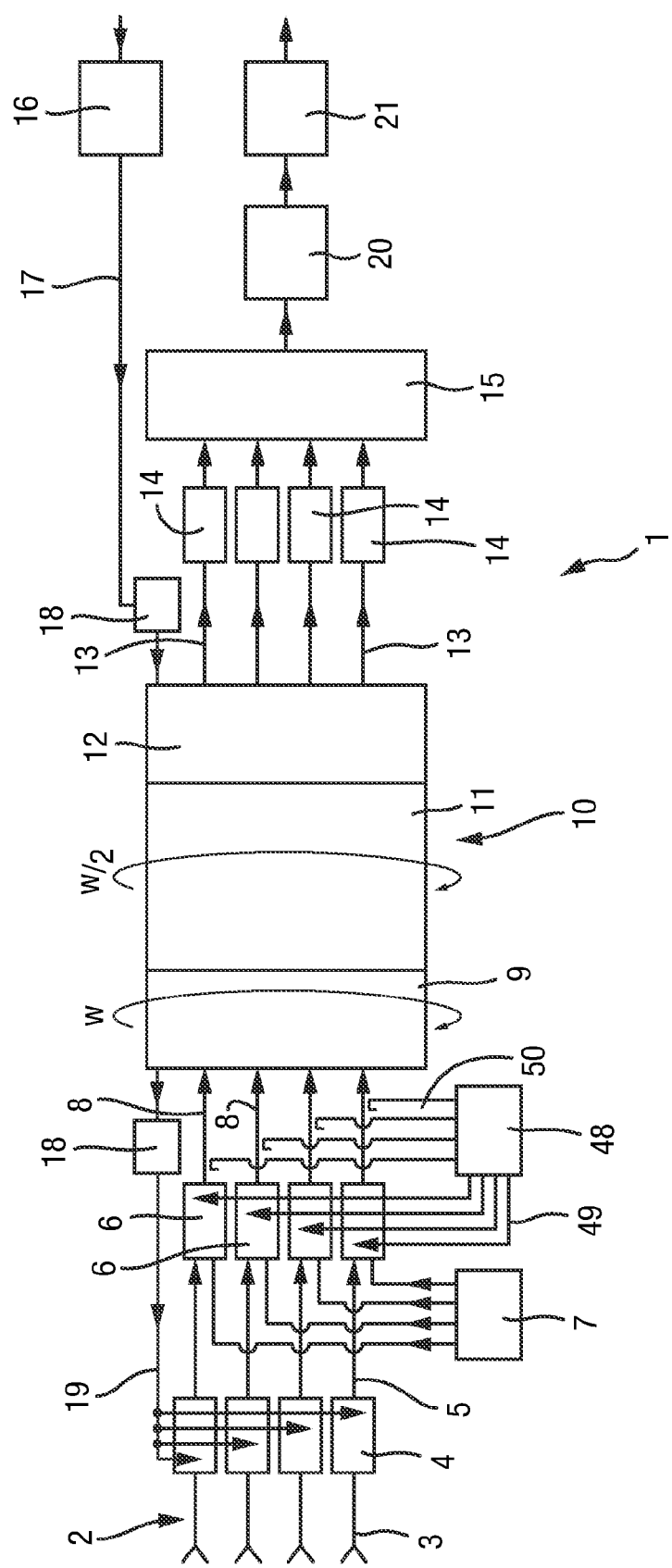
FIG. 1 schematically illustrates a radar antenna system comprising a radar antenna array rotationally coupled to a radar signal processing system via an optical rotary joint.

In the drawings, like items are assigned like reference symbols for consistency.

FIG. 1 shows a radar system 1 comprising an antenna array 2 having four separate antenna radiating elements 3 (or sub-arrays of multiple radiating elements) each served by a respective one of four separate RF transmitter/receiver units 4. It is to be noted that while only four signal channels are shown here, this is purely for illustrative purposes, and many more such channels may be present in other embodiments. Each transmitter/receiver unit contains a receiver apparatus for receiving RF signals, such as radar return (echo) signals, from a respective antenna radiating element and for generating amplified RF electrical signals typically via a super-heterodyne or the like such as would be readily apparent to the skilled person. Also, each transmitter/receiver unit contains a transmitter apparatus for generating RF radar output signals for radiation by a respective antenna radiating element. Each of the transmitter and receiver apparatus is connected to a common radiating element via a duplexer (not shown) which protects the receiver apparatus from signals generated by the transmitter apparatus, and directs received radar signals to the receiver apparatus. These components of apparatus may be such as would be readily apparent to the skilled person.

Each of the four transmitter/receiver units has a receiver analogue output RF transmission line 5 connected to an RF input modulation signal port of a respective one of four Mach-Zehnder (MZ) optical modulators 6 which also each have an optical carrier signal input port connected to receive an optical carrier signal from a laser unit 7 arranged to generate four separate optical carrier signals for each respective one of the four (MZ) optical modulators. The laser unit may comprise one or more laser light sources (e.g. solid-state lasers or otherwise) controlled to generate a substantially constant intensity optical output for use as a carrier signal. One such laser light source may be arranged to generate an optical carrier signal for two or more MZ modulators in common, and may be optically coupled thereto via an optical power divider such that two MZ modulators are served by sharing/splitting carrier light from one laser source.

Each MZ optical modulator is arranged to modulate the optical carrier signal received by it with analogue RF voltage signal received by the MZ modulator at its RF input modulation signal port, and to output the modulated analogue optical signal on a respective optical fibre 8 to a respective one of four collimator input ports of a first collimator unit 9 of an optical rotary joint 10, via a respective optical fibre. A bias is applied to each MZ modulator to control the MZ modulator so as to operate at or close to quadrature, as is explained in more detail below, with reference to FIGS. 3A, 3B and 4.

The optical rotary joint comprises a prism unit 11 containing a Dove prism (another type of reversion prism such as an Abbe-Konig prism may be used) which optically couples the modulated optical signals of each one of the four collimator input ports to a respective one of four collimator output ports of a second collimator unit 12 of the optical rotary joint. Each collimator unit is arranged to collimate a modulated optical signal received thereby. The axis of collimation of the first collimator unit is parallel to that of the second collimator unit. However, the first collimator unit is fixed to the rotating antenna head of the radar system which is arranged to rotate about a rotation axis parallel to the collimation axis, at a given angular rate of rotation ($\omega$) and is, therefore, rotary, whereas the second collimator unit is fixed to the stationary part of the radar system and does not rotate. The prism unit, located intermediate the rotary first collimator unit and the stationary second collimator unit, is arranged to rotate with the first collimator unit about the same axis of rotation but at half the angular rate of rotation ($\omega/2$). Thus, the first collimator unit is arranged to rotate relative to both the prism unit and the second collimator unit.

In this way, optical modulated (analogue) signals are transmitted from a rotating antenna element array to a stationary signal processing system via an optical rotary joint. Analogue to digital (A/D) conversion of signals is not required prior to transmission through the optical rotary joint and may be performed after such transmission. In this way, a compact optical rotary joint is provided which obviated the need for (A/D) converters in the rotating head of the antenna system.

The second collimator unit possesses four separate collimator output ports which each direct a collimated, modulated RF (analogue) optical signal via a respective one of four optical fibres 13, to a respective one of four separate opto-electrical converters 14 each arranged to convert a received analogue, modulated optical signal into a corresponding analogue, modulated RF electrical signal. Each opto-electrical converter may comprise a photodiode which is reverse-biased. Modulated light incident upon the photodiode is converted into a current proportional to the intensity of the incident light. The output of the photodiode is connected electrically in series to a resistor (not shown) which generates a voltage in proportion to the photodiode current. In alternative embodiments, the resistor may be replaced with a trans-impedance amplifier which may provide greater sensitivity in converting optical signals to voltage values.

The electrical, analogue modulated RF signals generated by the opto-electrical converters are each input to an analogue RF signal processor 15 of the type typically used in a radar apparatus for processing, such as amplification, filtering or the like, and subsequently output to an analogue-to-digital (A/D) signal converter 20 for subsequent output to a digital signal processor unit 21 for analysis, processing and general use, as desired by a user.

A transmitter control unit 16 is also provides which is arranged to generate digital control signals for controlling the operation of the transmitter apparatus within the transmitter/receiver units. The transmitter unit is arranged to output digital electrical transmitter control signals 17 to an electro-optical signal converter unit 18 arranged to convert the digital electrical signals into digital optical signals in a manner such as would be readily available to the skilled person. For example, the electro-optical signal converter may be a diode laser arranged to be driven by a drive signal containing the digital electrical transmitter/calibration control signals such that a digital optical signal is generated conveying the digital electrical signals in question. This digital optical signal is input to the second (stationary) optical collimator unit 12 and is subsequently transmitted via the Dove prism 11 to the first optical collimator unit 9 whereupon it is output by the first collimator unit to an opto-electrical converter 18 (being any suitable variety, such as would be readily available and apparent to the skilled person) arranged to convert the digital optical signals into digital electrical signals and output the result 19 to each one of the four transmitter/receiver units 4 to control the operation (e.g. transmitter power, timing) of the transmitter units via the transmitter control signals, or to control the operation of the receiver units. Optical transfer of the control signals via the optical rotary joint may be as described above in relation to optical transmission of modulated receiver signals 8, but in reverse direction via a fifth optical transmission path (not shown). The first and second collimator units may each comprise additional optical transmission paths like those illustrated, for additional optical channels.

Figure 2:
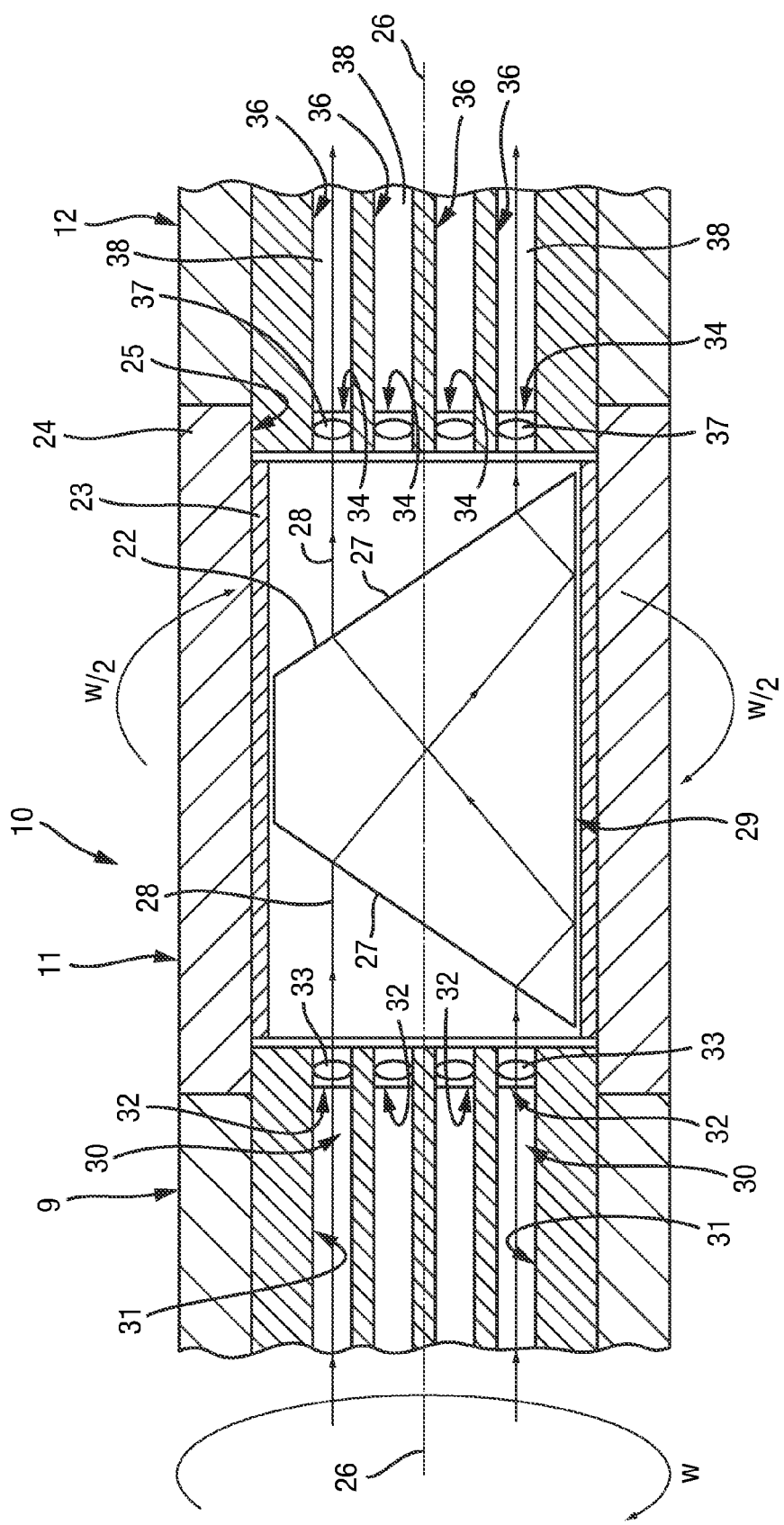
FIG. 2 shows a cross-sectional schematic of an optical rotary joint.

FIG. 2 shows a schematic cross-sectional view of the optical rotary joint described above with reference to FIG. 1.

The optical rotary joint 10 comprises a prism unit including a Dove prism 22 mounted within a prism mounting unit 23 fixed within the bore 25 of a prism housing part 24. The bore of the prism housing part is a through-bore which extends from one end of the housing part to the other axially along the central axis 26 of the prism housing. The Dove prism is a trapezoidal reversion prism defining a longitudinal, optical axis 26 therethrough and having opposite end faces 27 that are disposed at opposite but equal angles (e.g. 45 degrees) relative to the optical axis. As a result, optical signals 28 emitted parallel to the optical axis are received at one angled end (input/output) surface of the Dove prism and are refracted towards the longer trapezoidal base surface 29 of the prism where they are totally internally reflected to the second, opposite angled end (input/output) surface of the prism whereupon they are refracted as they exit the prism along a direction parallel to the optical axis. The longer base surface of the Dove prism in planar and parallel to the optical axis of the prism. Each one of the two angled end surfaces of the Dove prism is fully exposed by, and optically accessible via a respective and of the through-bore of the prism housing.

One end of the prism housing is mechanically coupled to a first collimator unit 9 containing an array of four optical fibre terminal ends 30 held in parallel side-by-side array within four parallel respective optical fibre housing bores 31 each housing an end of a respective one of the four optical fibres connected to the four MZ optical modulators. The axis of each optical fibre housing bore is parallel to the optical axis of the Dove prism, and each fibre housing bore terminates with an opening which places a terminal end 32 of the optical fibre therein in view of one angled end (input/output) surface of the Dove prism, via a converging collimation lens 33 housed within the respective fibre housing bore between the terminal end of the housed fibre and the terminal and of the fibre housing bore. Each collimation lens is arranged to collimate an optical signal output from the optical fibre within the fibre housing bore into a collimated optical beam parallel to the optical axis of the Dove prism, and also to receive a collimated optical signal from the Dove prism and direct it into the optical fibre within the fibre housing bore, when transmitting optical signals in the opposite direction. In each of the first and second collimator units, additional optical fibre housing bores house additional optical fibres and collimation lenses but are not shown in the cross-sectional view of FIG. 2. For example, a fifth optical fibre housing bore houses a fifth optical fibre and a fifth collimation lens, in each of the first and second collimator units, which are in optical communication via the Dove prism and serve as an optical transfer channel for transmitter control signals (17) sent to the transmitter units (4). Further such pairs or optically communicating fibres may be provided by the collimator units in any pattern within both collimator units—shared by each.

The other end of the prism housing is mechanically coupled to a second collimator unit 12 containing an array of four optical fibre terminal ends 34 substantially identical to those of the first collimator unit. The four optical fibres are coupled to the second collimator unit with their terminal ends held in parallel side-by-side array within four parallel respective optical fibre housing bores 36. The axis of each fibre housing bore is parallel to the optical axis of the Dove prism, and each fibre housing bore terminates with an opening which places a terminal end of the optical fibre end therein in view of the other one of the angled end (input/output) surfaces of the Dove prism, via a converging collimation lens 37 housed within the respective fibre housing bore between the terminal end of the housed fibre and the terminal and of the fibre housing bore. Each collimation lens is arranged to receive a collimated optical signal transmitted from the first collimator unit via the Dove prism and direct it into the optical fibre within a fibre housing bore of the second collimator unit. Conversely, each collimation lens may collimate an optical signal output from the optical fibre within the fibre housing bore of the second collimator unit, into a collimated optical beam parallel to the optical axis of the Dove prism for transmission to an optical fibre within the first collimation unit, when transmitting optical signals in the opposite direction.

The first collimator unit is rotationally coupled to the prism unit so as to be rotatable about the optical axis 26 of the Dive prism at a selected angular rate of rotation ($\omega$) corresponding to the rate of rotation of the antenna array to which the first collimator unit is fixedly coupled. The prism unit is coupled to the first collimator unit so as to rotate at half the angular rate of rotation ($\omega/2$) of the first collimator unit. This coupling is via a scale-down element or other speed-change gear mechanism (not shown) for transmitting the rotation of the first collimator unit to the prism unit at an angular velocity half the angular velocity of the first collimator unit. In this way, the mechanical power with which the rotating antenna array of the radar apparatus is rotated is transferred to the prism unit at the appropriate, scaled-down rate via the first collimator unit so as to drive rotation of the Dove prism at the appropriate rate. The prism unit is rotationally coupled to the non-rotating second collimator unit so as to be rotatable about the optical axis of the Dove prism 26 at the selected angular rate of rotation ($\omega/2$).

Each optical fibre 30 within the first collimator unit is optically coupled, and paired, to the same one optical fibre 38 in the second collimator unit, via the Dove prism. When the Dove prism is rotated about its optical axis, the position of an optical fibre within the first collimator unit rotates relative to the position of the corresponding (paired) optical fibre of the second collimator unit, at twice the relative prism rotation rate. However, optical coupling between the two paired optical fibres, provided by the Dove prism, remains unchanged at all prism rotation angles. This is illustrated with two optical rays in FIG. 2 at one angular position.

In this way, optical signals may be transmitted across the optical rotary joint.

Figure 3A:
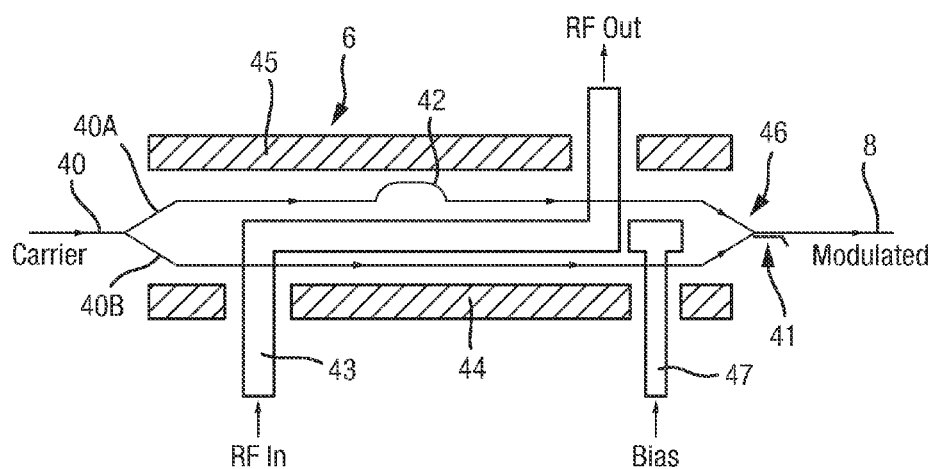
FIGS. 3A and 3B show a Mach-Zehnder optical modulator, and the transfer function of an on optical modulator.

The transmitted optical signals are analogue optical signals modulated with an RF signal generated by the antenna receiver units illustrated in FIG. 3A. As discussed above, a Mach-Zehnder (MZ) modulator provides the mechanism whereby an input optical carrier signal may be modulated with the RF radar signal. In this embodiment, the optical modulator is an interferometer, created by forming an optical waveguide in a suitable substrate such as Lithium Niobate (LiNbO3) or Gallium Arsenide (GaAs) or Indium Phosphide (InP).

An optical waveguide 40 of the MZ modulator is split into two branches, 40A and 40B, before being recombined at an optical coupler 41. An optical carrier signal in the form of a beam of light from a laser source 7 enters one side of the modulator as indicated by an arrow at the left-hand side of FIG. 3A, and exits the modulator at the opposite side, i.e. at the right-hand side of FIG. 3A, having passed through both branches, 40A and 40B, of the waveguide.

One of the waveguide branches 40A includes an asymmetry 42 that functions to introduce a phase difference between light travelling down respective branches of the waveguide. The phase difference is chosen to be approximately 90 degrees at the wavelength of operation, which is typically in the region of 1300 or 1550 nanometers. This induces a quadrature bias where the optical output power is nominally 50% of its maximum value.

Lithium Niobate (in common with other similar materials such as GaAs or InP) is a glass-like material with a crystal structure that exhibits an electro-optic effect whereby the refractive index of the crystal structure changes as a voltage is applied thereto. In particular, the direction of the electric field induced by the applied voltage causes an increase or decrease in refractive index. An increased refractive index acts so as to slow light travelling through the crystal, and a decreased refractive index acts so as to increase the speed of light travelling through the crystal.

As shown in FIG. 3A, a modulating electrode 43 is provided between the branches of the waveguide. When the modulating electrode is energised by an applied signal (e.g. a radio frequency signal), positive and negative electric fields are established between the modulating electrode and, respectively, a first 44 and a second 45 ground plane. The modulating electrode is designed as a transmission line so that the modulating signal travels with the optical carrier signal through the MZ modulator, thereby enabling high modulating frequencies to be achieved.

The positive and negative electric fields cause the refractive index of the two branches of the waveguide to change. A positive field causes an increase in refractive index for one branch, and a negative field causes a decrease in refractive index for the other branch, and the resulting different propagation speeds of the optical carrier signal through each branch cause a change in phase in the signals output to the optical combiner 46. This phase change causes the output power level of light from the optical combiner to change. In effect, as the electric fields experienced by each branch varies with the RF signal applied to the modulating electrode, so the phase difference between light passing through the two branches changes and the output power level of the optical signal output from the combiner varies accordingly. The net effect of this is that the input optical carrier signal is modulated with the RF signal applied to the modulating electrode.

Figure 3B:
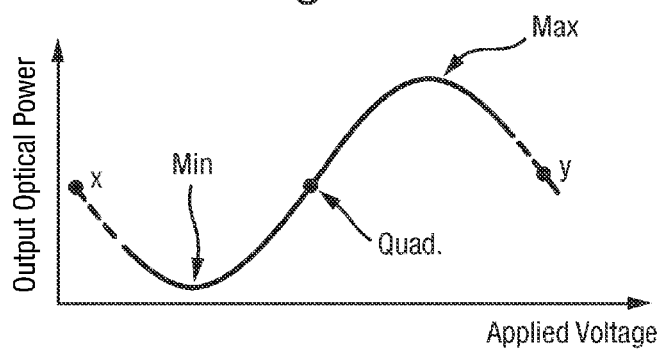

FIG. 3B is a schematic illustration (not to scale) showing the MZ modulator transfer function. This transfer characteristic of the MZ modulator is approximately sinusoidal. The most linear modulation tends to be achieved in and around the quadrature point (also known simply as "quadrature"). The quadrature point is the point where there is a 90 degree phase relationship between light travelling through respective branches of the waveguide of the MZ modulator. The transfer function is a repeating function, and as such there are many quadrature points at different bias voltages but all with the same power output. Indicated in FIG. 3B by the reference sign "Quad" is a first quadrature point. At this first quadrature point "Quad" the output power is increasing with bias voltage, and hence this quadrature point "Quad" is referred to as a positive slope quadrature bias point. Further quadrature points (e.g. shown as "x" and "y" in FIG. 3B) occur either side of "Quad" where the output power is decreasing with bias voltage. These quadrature points are each referred to as negative slope quadrature bias points.

In practice, the preferred 90 degree phase shift is rarely achieved. To compensate for this, the MZ modulator according to preferred embodiments of the invention includes a biasable component 47, as shown in FIG. 3A. A DC bias voltage is applied to the biasable component to return the MZ modulator to or near to one of the aforementioned quadrature points. In the arrangement depicted in FIG. 3A, the biasable component comprises a discrete bias electrode (this is merely illustrative as a number of alternative arrangements are known to persons skilled in the art). For example, a bias voltage may be applied directly to the modulating electrode by means of a so-called bias-Tee. In such an arrangement, the DC bias may be coupled to the electrode via an inductor, and the applied signal (RF signal) would be coupled to the electrode via a capacitor.

The bias point, i.e. the voltage that needs to be applied to the biasable component to return the MZ modulator to or near the quadrature point, has been found to have a tendency to shift over time. For example, so-called trapped charges (e.g. that exist in the regions between electrodes, e.g. in a silicon dioxide buffer layer on the surface of the device) and temperature variations can each cause the bias point to shift at a rate of anything from a few millivolts per hour to several volts per hour. As such it is preferable to provide a dynamic bias control to enable modulator linearity to be maintained over an extended period of time.

In the analogue domain, this has been found to be important to enable accurate analogue optical transmission of RF signals.

A bias control unit 48 is arranged with the rotating antenna elements to apply a method of controlling a bias voltage supplied to each optical modulator, separately. Each MZ modulator comprises a biasable component 47 that is configurable to be biased by application of the bias voltage 49 such that the modulator operates at quadrature. The bias controller is arranged to provide a target for the output optical power of the MZ modulator which is an output power corresponding to the modulator operating at quadrature. The bias control unit applies to the biasable component a bias voltage having an initial value of 0V, and thereafter, it varies the bias voltage until the value of the bias voltage is the value that is closest to the initial value and that biases the biasable component so that the output optical power of the modulator is within a pre-defined range of the target output power.

The bias control unit monitors the output optical power of the MZ modulator and, if the output power of the modulator is determined to be outside the pre-defined range of the target output power, it further varies the value of the bias voltage so as to bring the output optical power of the modulator back to being within the pre-defined range of the target output power.

This step of further varying the value of the bias voltage may include comparing the output optical power of the modulator to the target output optical power to determine whether the output optical power of the MZ modulator is either higher or lower than the pre-defined range of the target output power. The bias control unit may determine a direction of a slope of the output optical power of the modulator relative to (as a function of) the applied bias voltage, and depending on the determined slope direction and whether the output power of the modulator is either higher or lower than the pre-defined range of the target output power, either increase or decrease the bias voltage by a predetermined amount (e.g. in steps of between 75 mV and 150 mV, e.g. 125 mV).

The size of the predetermined amount by which the bias voltage is either increased or decreased may be selected or dependent upon how long the modulator has been operating at quadrature.

The step of varying the bias voltage may comprise comparing the output power of the modulator to the target output power to detect when the output power of the modulator is within the pre-defined range of the target output power (e.g. within 5%, or preferably 2%, or more preferably 1%), or if the output power of the modulator is substantially equal to the target output power.

The step of varying the bias voltage may include starting at the initial value, and then sweeping the bias voltage in a zigzag (temporal) pattern with gradually increasing amplitude. That is to say, e.g. by applying successive bias voltages of opposite sign and optionally of increasing magnitude. This may be an asymmetric pattern whereby the positive bias values of bias voltage within the pattern have magnitudes which are not repeated in the magnitude of negative values. The varying of the bias voltage is preferably performed such that the bias voltage is confined to being within a pre-defined bias voltage range.

Figure 4:
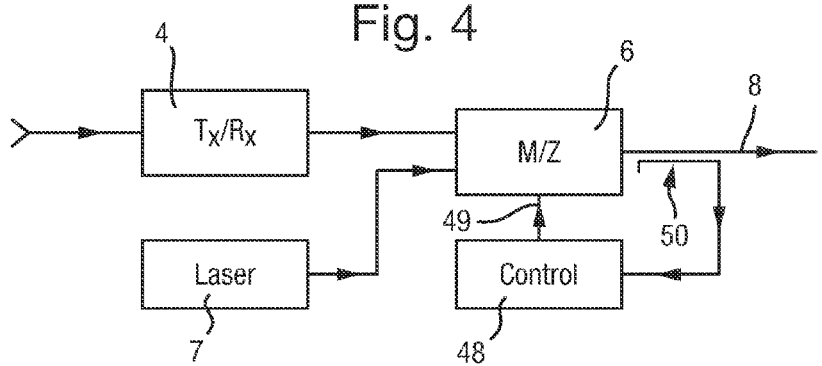
FIG. 4 schematically shows the optical modulator of FIG. 3A in combination with input and control elements shown in FIG. 1.

FIG. 4 is a schematic illustration (not to scale) of an example of a bias controller as implemented on each RF signal transmission line 8 from the four receiver units of the antenna of FIG. 1.

The bias controller 48 is coupled to the MZ modulator 6 which is driven by a continuous wave laser 7 operable to provide an optical carrier signal with which an RF signal from the transmitter/receiver unit is to be modulated. In this example, the modulator includes a separate bias electrode 47 as shown in FIG. 3A, however other arrangements are possible.

The bias controller comprises a photodiode (not shown) that is coupled to the modulator output by means of an optical tap coupler 50. The optical tap coupler is operable to monitor the optical signal output of the MZ modulator and pass approximately 1 to 5% of that output to the photodiode. The photodiode is reverse-biased. Light incident on the photodiode is converted to current, proportional to the incident light, which is passed through a resistor (not shown). The resistor converts the current passed to the resistor to a voltage. The voltage dropped across the resistor is compared to a target voltage, which is a voltage that is indicative of a target optical power for the modulator for quadrature. This is done to determine whether the reference voltage (i.e. the voltage supplied by the resistor) is too high, too low, or acceptable relative to the target voltage. The terminology "acceptable" may, for example, be used to refer to reference voltages within 1% of the target voltage. The terminology "too high" may, for example, be used to refer to reference voltages that are greater than or equal to the target voltage plus 1%. The terminology "too low" may, for example, be used to refer to reference voltages that are less than or equal to the target voltage minus 1%. The bias control unit varies, as described above, (or maintains) the bias voltage applied to the MZ modulator accordingly.

The antenna system may comprise many more RF signal transmission lines/channels than the four shown in FIGS. 1 and 2, and may comprise at least 20 to 30 optical modulators and 20 to 30 opto-electrical converters, with the optical rotary joint comprising first and second collimator units having a corresponding 20 to 30 collimation bores optically coupled via the Dove prism.

The embodiments described above are presented for illustrative purposes and it is to be understood that variations, modifications and equivalents thereto such as would be readily apparent to the skilled person are encompassed within the scope of the invention.

The invention claimed is:

1. An optical signal transmission apparatus for a rotating antenna comprising:
    a plurality of optical modulators arranged for receiving a respective plurality of analogue radio frequency (RF) signals and for modulating a respective plurality of optical signals therewith to produce a respective plurality of modulated analogue optical signals;
    an optical rotary joint including a reversion prism for optically transmitting the plurality of modulated analogue optical signals along a respective plurality of optical signal paths from the optical modulators; and
    a respective plurality of opto-electrical converters for receiving and converting the respective modulated analogue optical signals from the optical rotary joint along the respective optical signal paths into a respective plurality of analogue electrical signals,
    wherein the plurality of optical modulators are rotationally coupled in optical communication with the respective plurality of opto-electrical converters via the optical rotary joint including the reversion prism.

2. The optical signal transmission apparatus according to claim 1 in which one of the optical modulators includes a laser for generating an optical carrier signal and a Mach-Zehnder (MZ) modulator arranged to modulate the carrier signal according to a corresponding one of the analogue RF signals.

3. The optical signal transmission apparatus according to claim 2 in which the MZ modulator includes a biasable component being configurable to be biased by an application of a bias voltage such that the MZ modulator operates at quadrature.

4. The optical signal transmission apparatus according to claim 3 including a bias controller arranged to vary the bias voltage applied to the biasable component until the applied bias voltage is a closest bias voltage at which the MZ modulator operates at quadrature.

5. The optical signal transmission apparatus according to claim 1 in which the reversion prism is rotationally coupled to the plurality of optical modulators and to the plurality of opto-electrical converters so as to be rotatable relative to the plurality of optical modulators and to the plurality of opto-electrical converters at an angular rate of rotation that is substantially half an angular rate of rotation at which the plurality of optical modulators are concurrently rotatable relative to the respective plurality of opto-electrical converters.

6. The optical signal transmission apparatus according to claim 1 comprising a first optical collimator unit arranged to receive and to collimate said plurality of modulated analogue optical signals for input to the reversion prism, and a second optical collimator unit arranged to receive and to collimate said plurality of modulated analogue optical signals output from the reversion prism, wherein the first and second collimator units share substantially parallel axes of collimation.

7. The optical signal transmission apparatus according to claim 1 comprising at least 20 said optical modulators and 20 said opto-electrical converters.

8. A method for optical signal transmission for a rotating antenna, the method comprising:
    receiving a plurality of analogue radio frequency (RF) signals at a respective plurality of optical modulators and modulating a respective plurality of optical signals therewith to produce a respective plurality of modulated analogue optical signals;
    optically transmitting the plurality of modulated analogue optical signals along a respective plurality of optical signal paths from the respective optical modulators to a respective plurality of opto-electrical converters via an optical rotary joint including a reversion prism; and
    demodulating the plurality of modulated analogue optical signals into a respective plurality of analogue electrical signals using the respective plurality of opto-electrical converters.

9. The method according to claim 8 in which one of the optical modulators includes a laser for generating an optical carrier signal and a Mach-Zehnder (MZ) modulator, and the method includes modulating the carrier signal according to a corresponding one of the analogue RF signals.

10. The method according to claim 9 in which the MZ modulator includes a biasable component, and the method includes biasing the biasable component by an application of a bias voltage such that the MZ modulator operates at quadrature.

11. The method according to claim 10 including varying the bias voltage applied to the biasable component until the applied bias voltage is a closest bias voltage at which the MZ modulator operates at quadrature.

12. The method according to claim 8 including rotating the plurality of optical modulators relative to the respective plurality of opto-electrical converters at a first angular rate of rotation, and concurrently rotating the reversion prism relative to the plurality of optical modulators and to the plurality of opto-electrical converters at an angular rate of rotation that is substantially half of the first angular rate of rotation.

13. The method according to claim 8 comprising collimating said plurality of modulated analogue optical signals according to a first axis of collimation, inputting the collimated plurality of modulated analogue optical signals to the reversion prism, and receiving and collimating said plurality of modulated analogue optical signals output from the reversion prism according to a second axis of collimation substantially parallel to the first axis of collimation.

14. The method according to claim 8 including receiving, optically modulating, optically transmitting and subsequently demodulating at least 20 said analogue RF signals concurrently.

15. A non-transitory computer program product encoded with instructions that when executed by a computer system cause a process to be carried out for optical signal transmission for a rotating antenna, the process comprising:
   receiving a plurality of analogue radio frequency (RF) signals at a respective plurality of optical modulators and modulating a respective plurality of optical signals therewith to produce a respective plurality of modulated analogue optical signals;
   optically transmitting the plurality of modulated analogue optical signals along a respective plurality of optical signal paths from the respective optical modulators to a respective plurality of opto-electrical converters via an optical rotary joint including a reversion prism; and
   demodulating the plurality of modulated analogue optical signals into a respective plurality of analogue electrical signals using the respective plurality of opto-electrical converters.

16. The computer program product according to claim 15 in which one of the optical modulators includes a laser for generating an optical carrier signal and a Mach-Zehnder (MZ) modulator, and the process includes modulating the carrier signal according to a corresponding one of the analogue RF signals.

17. The computer program product according to claim 16 in which the MZ modulator includes a biasable component, and the process includes biasing the biasable component by an application of a bias voltage such that the MZ modulator operates at quadrature.

18. The computer program product according to claim 17, the process further including varying the bias voltage applied to the biasable component until the applied bias voltage is a closest bias voltage at which the MZ modulator operates at quadrature.

19. The computer program product according to claim 15, the process further including rotating the plurality of optical modulators relative to the respective plurality of opto-electrical converters at a first angular rate of rotation, and concurrently rotating the reversion prism relative to the plurality of optical modulators and to the plurality of opto-electrical converters at an angular rate of rotation that is substantially half of the first angular rate of rotation.

20. The computer program product according to claim 15, the process further comprising collimating said plurality of modulated analogue optical signals according to a first axis of collimation, inputting the collimated plurality of modulated analogue optical signals to the reversion prism, and receiving and collimating said plurality of modulated analogue optical signals output from the reversion prism according to a second axis of collimation substantially parallel to the first axis of collimation.

* * * * *